No. 721,351. PATENTED FEB. 24, 1903.
J. F. APPLEBY.
BUNDLE CARRIER FOR SELF BINDING HARVESTERS.
APPLICATION FILED JUNE 3, 1899.
NO MODEL. 3 SHEETS—SHEET 1.
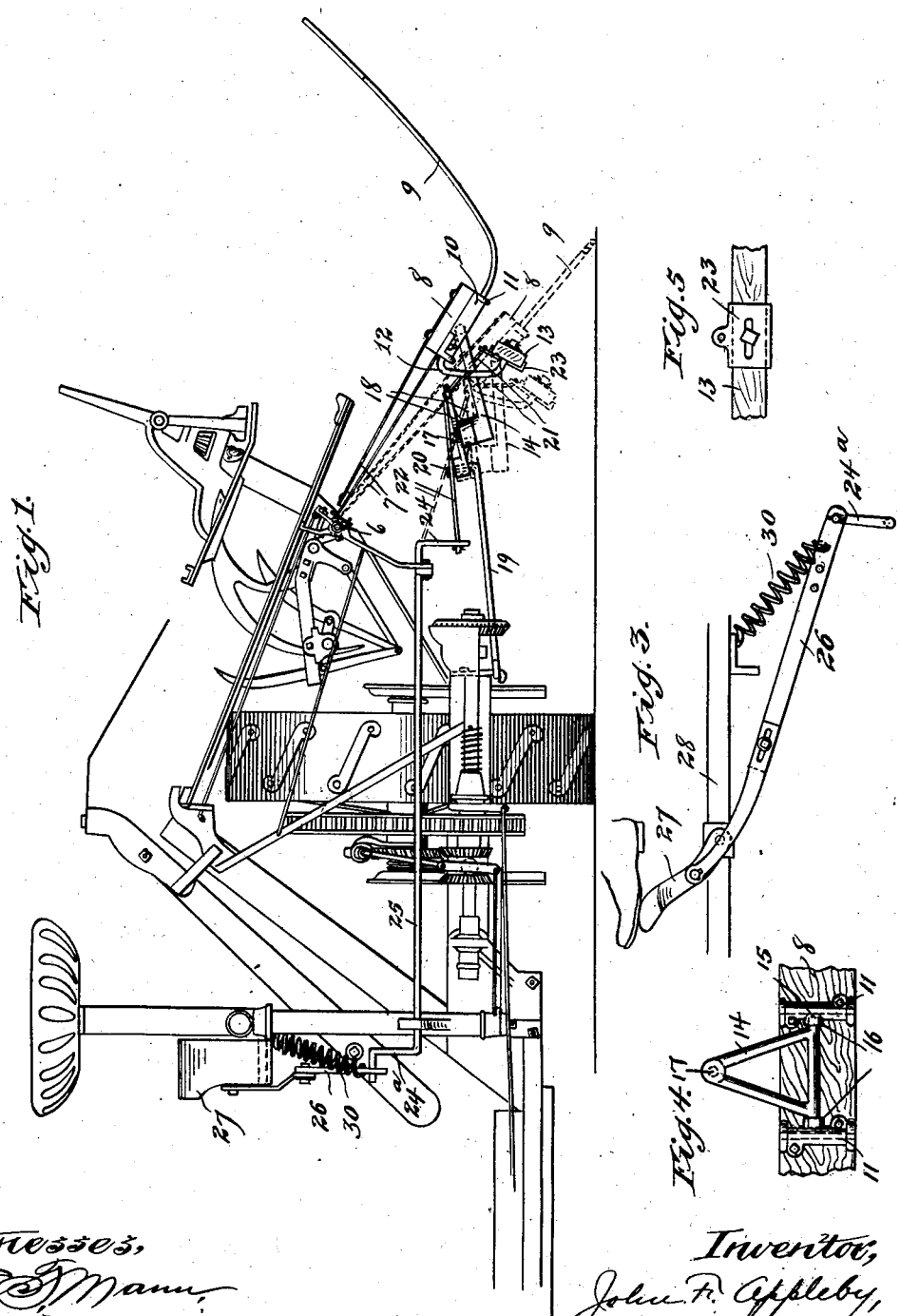

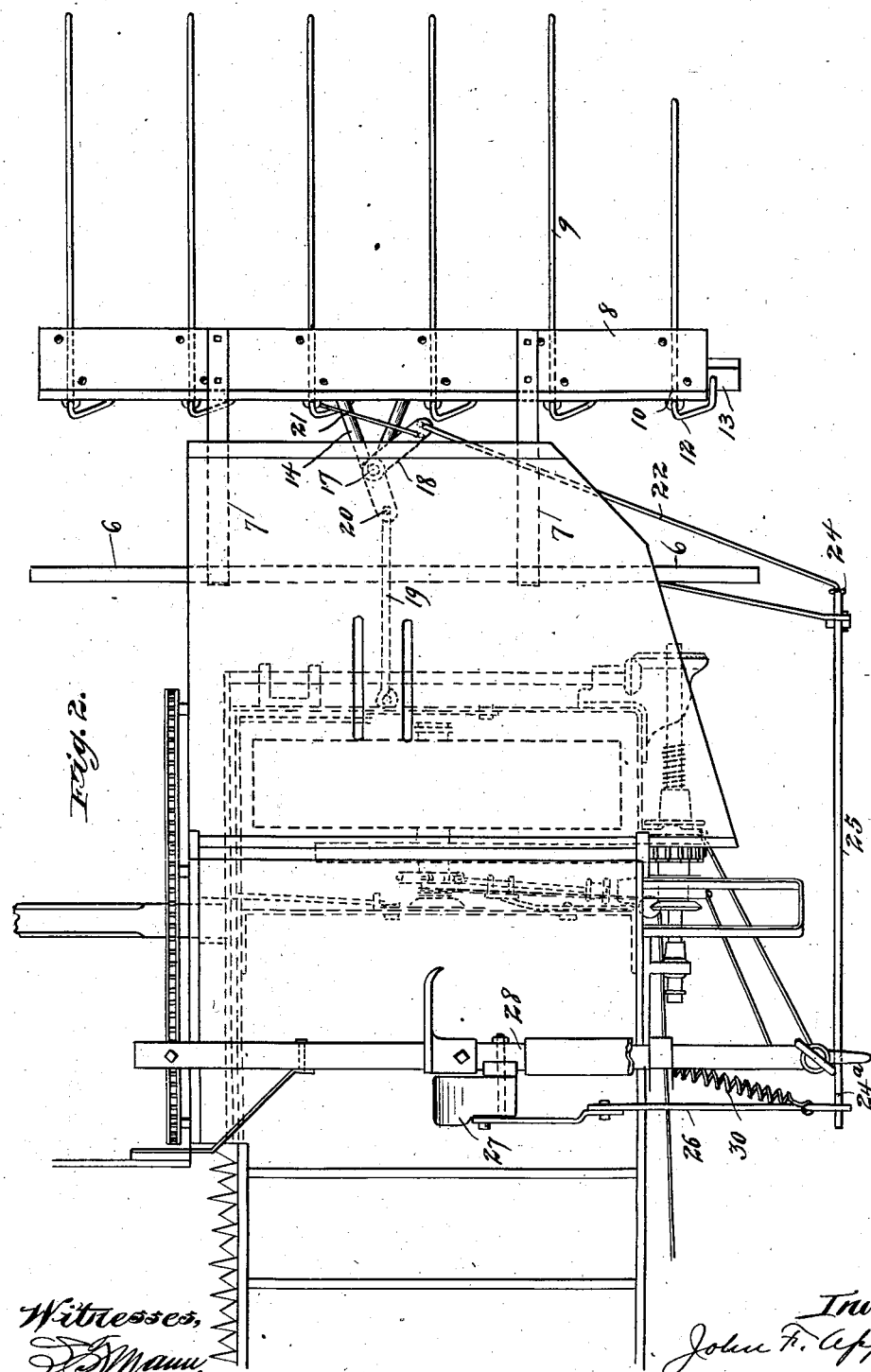

No. 721,351. PATENTED FEB. 24, 1903.
J. F. APPLEBY.
BUNDLE CARRIER FOR SELF BINDING HARVESTERS.
APPLICATION FILED JUNE 3, 1899.
NO MODEL. 3 SHEETS—SHEET 3.
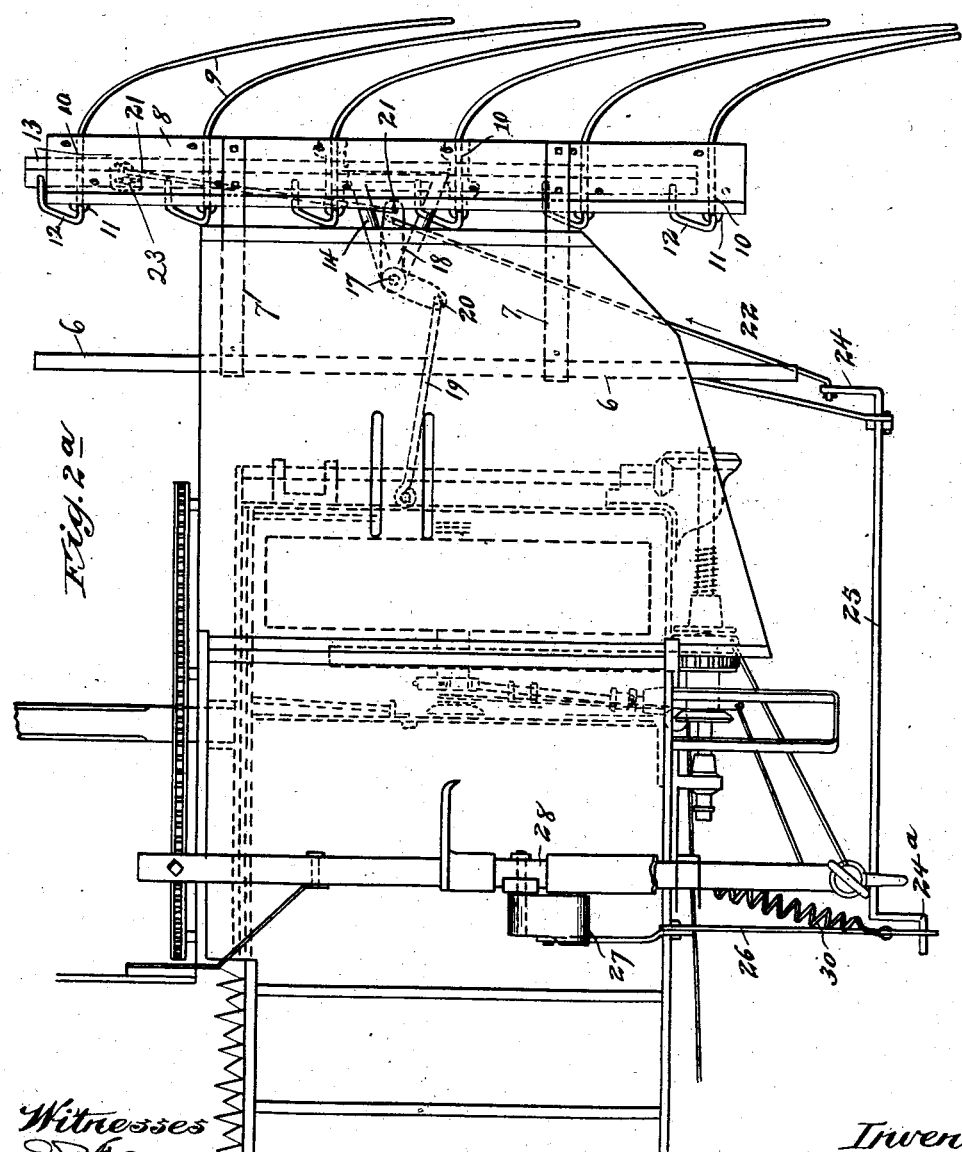

UNITED STATES PATENT OFFICE.

JOHN F. APPLEBY, OF CHICAGO, ILLINOIS, ASSIGNOR TO THE HARVESTER KING COMPANY, OF HARVEY, ILLINOIS, A CORPORATION OF ILLINOIS.

BUNDLE-CARRIER FOR SELF-BINDING HARVESTERS.

SPECIFICATION forming part of Letters Patent No. 721,351, dated February 24, 1903.

Application filed June 3, 1899. Serial No. 719,224. (No model.)

*To all whom it may concern:*

Be it known that I, JOHN F. APPLEBY, of Chicago, in the county of Cook and State of Illinois, have invented certain new and useful Improvements in Bundle-Carriers for Self-Binding Harvesters, of which the following is a specification.

This invention relates to an improvement in that class of bundle-carriers in which a series of tines or fingers are journaled in bearings on a tine-bar and provided with crank ends journaled in a tine-shifting bar, with connections extending therefrom to the driver's platform, whereby the bar may be shifted and the tines rocked to cause their points to trend backward and downward to discharge the bundles. Heretofore carriers of this class have been so arranged that the driver in order to discharge the bundles must exert sufficient force upon the foot-treadle to practically counterbalance the weight of the bundles and their resistance to discharge as the fingers or tines are folded beneath them. This necessitates considerable effort upon the part of the driver, and the operation being repeated throughout the day involves an amount of labor which is exhausting, while the work itself is not as smoothly and satisfactorily performed as desired.

It is the object of my invention to improve this class of bundle-carriers, so as to make the dumping or discharge of the bundles practically automatic, the operator being required to do nothing more than to lift his foot from the foot-treadle, the weight of the foot serving as a brake on the tripping mechanism and the weight of the bundles being utilized to shift the mechanism and fold the tines, so as to discharge the bundles, the tines being restored to their normal position by a spring.

My invention is illustrated in the accompanying drawings, in which—

Figure 1 is a rear elevation of the framework of the machine, showing the binding mechanism and a part of the platform, the latter broken away, with the bundle-carrier in two positions, the full lines representing the normal position and the dotted lines the dumping position. Fig. 2 is a plan view of the same parts, showing the bundle-carrier in the normal position—that is, with the tines extended or in the carrying position—and Fig. 2ª is a similar view showing the tines folded or in the dumping position. Fig. 3 is a detail view showing the foot-treadle and its operating-lever in side elevation. Fig. 4 is a detailed view of a triangular frame forming a support for a bell-crank lever which operates the shifting mechanism. Fig. 5 is a detail of an adjustment-plate for changing the set of the tilting or dumping mechanism.

The bundle-carrier in the construction illustrated is hinged to and supported from a pipe or bar 6, on which the binding mechanism slides, by means of the straps 7, which are provided with hooks at one end to take over the bar 6, their opposite ends being rigidly secured to the tine-bar 8. The tines 9, as shown, are iron rods having straight portions 10, which pass through bearing-boxes 11, secured to the under side of the tine-bar, and crank ends 12, which are journaled in the shifting-bar 13. A triangular support 14 has studs 15, which are journaled in sockets 16 on two of the boxes 11, located near the middle of the tine-bar, the apex of the triangular support projecting toward the machine between two of the crank ends of the tine-bar and having an upstanding stud 17 to form a vertical pivot for a bell-crank 18. This bell-crank is connected by a brace 19 to the machine-frame, the brace being hinged to the frame and having an upturned end 20, forming a vertical pivot passing through a long bearing on the bell-crank. This bearing or pivot, as well as the bearing for the upstanding stud on the triangular support, are long, so as to prevent any tilting or tipping movement in the connection, while permitting the parts to swing or turn freely around their pivotal axes. To the opposite arm of the bell-crank are pivotally connected two rods 21 22, the rod 21 being secured at its opposite end to an adjusting-plate 23, clamped on the shifting-bar 13, and the rod 22 being sleeved over a crank 24 on the rock-shaft 25, the latter being supported near its ends from the framework of the machine. At its opposite end the rock-shaft has a crank 24ª, and a bar 26 is pivotally secured thereto and to a foot-treadle 27, which is pivoted on the seat-bar support 28. The connecting-bar 26 is preferably formed in two parts adjustably connected together, so as to provide for accurate adjustment. This connecting-bar has a retracting-spring 30 hitched thereto and also to the seat-bar support.

The parts connected as above described are intended to operate in the following manner: In the normal position the tines extend outwardly in line with the platform, and they are usually curved upwardly, so as to hold a number of bundles of grain. They are sustained in this position normally by the pull of the retracting-spring 30. The driver rests one foot upon the treadle 27, and the weight of the foot is sufficient when assisted by the spring to hold the tines extended under the weight of any number of bundles which it may be desired to collect at one time. In this position the pivotal points of the brace 19 and bell-crank are nearly in line, the pivot 20 being slightly out of line to prevent absolute locking of the bell-crank. The positions of the pivotal points of the bell-crank and brace determine the force necessary to hold the tines extended under the weight of the bundles. Preferably they are so disposed that, as above stated, the weight of the driver's foot in addition to the pull of the spring will hold the tines extended under their superimposed load of bundles. To dump the bundles, it is only necessary for the driver to lift his foot, when the weight of the bundles upon the tines will overcome the pull of the spring sufficiently to cause the tines to fold. In this folding operation the bundle-carrier swings down slightly upon its pivotal support from the framework of the machine, the two positions being shown best in the full and dotted lines, respectively, of Fig. 1. The pivotal points of the brace and the bell-crank also change their relations during this folding action, the secondary position being shown in Fig. 2ª. In passing from one position to the other the leverage afforded by the weight of the bundles is greatly accelerated toward the close of the movement. As soon as the operator lifts his foot and the tines commence to fold under the weight of the bundles the pivotal points of the brace and the bell-crank change their relation, so that the power exerted by the bundles tending to fold the tines is greatly increased and is greater than could be opposed by the operator through the foot-treadle. This makes the delivery not only rapid, but certain and effective. The shortening of the line between the center of the bell-crank and the connecting-point of the brace to the frame, due to shifting of the pivotal points of the bell-crank and the brace, also permits the downward swing of the bundle-carrier as a whole, and by this means the tines are brought to a slant, which facilitates the discharge of the bundles, the slope of the tines being such as to permit the bundles to slide off readily. Normally I support the bundle-carrier at a slightly higher elevation than heretofore in order to render more effective the weight of the bundles upon the tines to assist in the dumping operation, while in the folded position the tines are brought practically into contact with the ground and in the most effective position for dumping. The sides of the triangular support afford stops to limit the movement of the tines in both directions. In the normal position the arm of one tine strikes upon one of the sides of the triangular support, while in the dumping position the arm of the other tine strikes upon the opposite side of the triangular support.

Obviously the principle of my invention may be embodied in structures considerably varied from that herein illustrated and described; but this principle of employing the weight of the bundles to effect the dumping is the essential feature of my invention.

I am aware that bundle-carriers have heretofore been used in which folding tines connected to a tine-shifting bar are employed, and I am also aware of the prior use of bundle-carriers in which the carrier is hinged to the frame of the machine and held in position to receive the bundles by a locking mechanism which when released permits the bundle-carrier to drop down under the weight of the bundle, the tines turning upon their journals and folding or collapsing as they are withdrawn from beneath the bundles by the movement of the machine forward. In the last-named construction the carrier has to be returned to its normal position by means of power applied to a foot lever or treadle by the driver; but in my construction the weight of the bundles is made to operate upon a hinged carrier and through the instrumentality of a second connection to the framework the folding is accomplished entirely by the weight of the bundles. Before the tines strike the ground the movement carries the bundles rearward, thus freeing the tines from the bundles before another bundle is discharged from the binding mechanism, while the normal position of the bundle-carrier is recovered by the aid of the retracting-spring, which acts promptly and without any effort upon the part of the operator.

I claim—

1. In a bundle-carrier of the type described the combination with a tine-supporting bar hinged to the framework of the machine and a support carried thereby, of a tine shifting or folding bar and a jointed connection between the tine shifting or folding bar and the framework, said connection comprising a member pivoted upon said support, links pivotally connecting said member to the tine-shifting bar and to said framework respectively, and means under the control of the driver for rocking the pivoted member, substantially as described.

2. In a bundle-carrier of the type described, the combination with a tine-supporting bar hinged to the framework of the machine, of a tine shifting or folding bar having a jointed connection with the framework of the machine, comprising a pivoted bell-crank, a support therefor mounted upon the tine-supporting bar, said bell-crank having its extremities pivotally connected to the frame of the machine, to the tine-folding bar and to operating mechanism extended to the driver's station.

3. In a bundle-carrier of the type described the combination with a tine-supporting bar hinged to the framework of the machine and a support carried thereby, of a tine shifting or folding bar and a jointed connection between the tine shifting or folding bar and the framework, said connection comprising a member pivoted upon said support, links pivotally connecting said member to the tine-shifting bar and to said framework respectively, means under the control of the driver for rocking the pivoted member on its support, and a retracting-spring for returning the parts to their normal position, substantially as described.

4. A bundle-carrier comprising a tine-supporting bar adapted to be hinged to the frame of a harvester and having a series of tines journaled therein and provided with cranked extremities, a shifting-bar connected to said cranked extremities, a support hinged to the tine-bar, a bell-crank pivoted between its ends upon said support, a brace hinged to the frame of the harvester at one end and having its opposite end pivotally connected to the bell-crank and pivoted connections between the bell-crank, the shifting-bar and a foot-treadle, whereby the weight of the bundles tends to depress the tine-supporting bar and to fold the tines, substantially as described.

5. A bundle-carrier comprising a tine-supporting bar adapted to be hinged to the frame of a harvester and having a series of tines journaled therein and provided with cranks, a tine-shifting bar in which the cranks are journaled, a support hinged to the tine-supporting bar and projecting between two of the cranks of the tines and adapted to contact therewith in the two extreme positions of the shifting-bar, a bell-crank pivotally mounted on the support and having an oscillatory movement parallel to the plane of movement of the shifting-bar, a brace hinged to the frame of the harvester and pivotally connected to the bell-crank, a rod pivotally connected to the bell-crank and adjustably secured to the shifting-bar, connections extending from the bell-crank to the driver's station, and a retracting-spring to return the shifting-bar to its normal position, substantially as described.

JOHN F. APPLEBY.

Witnesses:
FREDERICK C. GOODWIN,
E. L. HUBER.